US009199752B2

(12) United States Patent
Kivelä

(10) Patent No.: US 9,199,752 B2
(45) Date of Patent: Dec. 1, 2015

(54) METHOD AND APPARATUS FOR PRODUCING WRAPPED BALES

(75) Inventor: Kalle Kivelä, Siilinjärvi (FI)

(73) Assignee: Cross Wrap OY, Siilinjarvi (FI)

(*) Notice: Subject to any disclaimer, the term of this patent is extended or adjusted under 35 U.S.C. 154(b) by 826 days.

(21) Appl. No.: 13/515,767

(22) PCT Filed: Nov. 2, 2010

(86) PCT No.: PCT/FI2010/050871
§ 371 (c)(1),
(2), (4) Date: Jun. 14, 2012

(87) PCT Pub. No.: WO2011/051572
PCT Pub. Date: May 5, 2011

(65) Prior Publication Data
US 2012/0260609 A1 Oct. 18, 2012

(30) Foreign Application Priority Data
Nov. 2, 2009 (FI) .................. 20096129

(51) Int. Cl.
B65B 11/58 (2006.01)
B65B 11/04 (2006.01)
(Continued)

(52) U.S. Cl.
CPC ............ B65B 11/008 (2013.01); A01F 15/071 (2013.01); B65B 11/045 (2013.01); B65B 11/58 (2013.01); B65B 63/026 (2013.01); B65B 2210/18 (2013.01)

(58) Field of Classification Search
CPC ............ A01F 2025/142; A01F 2015/0755; A01F 2015/074; A01F 2015/0735; A01F 15/071; B65B 11/045; B65B 11/04; B65B 11/58; B65B 11/025; B65B 11/008; B65B 63/026; B65B 2210/18

USPC .......... 53/399, 439, 441, 465, 530, 556, 588, 53/203, 210, 218
See application file for complete search history.

(56) References Cited

U.S. PATENT DOCUMENTS 4,553,374 A * 11/1985 Lancaster et al. ............... 53/465
4,593,518 A * 6/1986 Lancaster ........................ 53/556
(Continued)

FOREIGN PATENT DOCUMENTS

AU 700740 B2 1/1999
DE 3431628 A1 * 3/1986 ............ B65B 11/008
(Continued)

OTHER PUBLICATIONS

Finnish Search Report; FI20096129; Sep. 24, 2010, 5 pages.
(Continued)

Primary Examiner — Stephen F Gerrity
(74) Attorney, Agent, or Firm — Pierce Atwood LLP; Kevin M. Farrell; Reza Sadr

(57) ABSTRACT

An apparatus for producing wrapped bales comprises a wrapping device for circulating a web dispensing device in a first plane of rotation around a bale during a first wrapping stage. The surface of the web of wrapping material is kept substantially normal to the first plane of rotation. During a second wrapping stage, the bale may further be rotated by a rotating device in a second plane of rotation substantially normal to the first plane of rotation. Between the first and the second stages, the surface of the wrapping material web may be turned about 90° such that the surface of the web is always substantially normal to the planes of rotation in both stages. The first wrapping stage includes using a tunnel device, which makes it possible to produce both unbound wrapped bales and bound wrapped bales.

22 Claims, 4 Drawing Sheets

Figure 1:
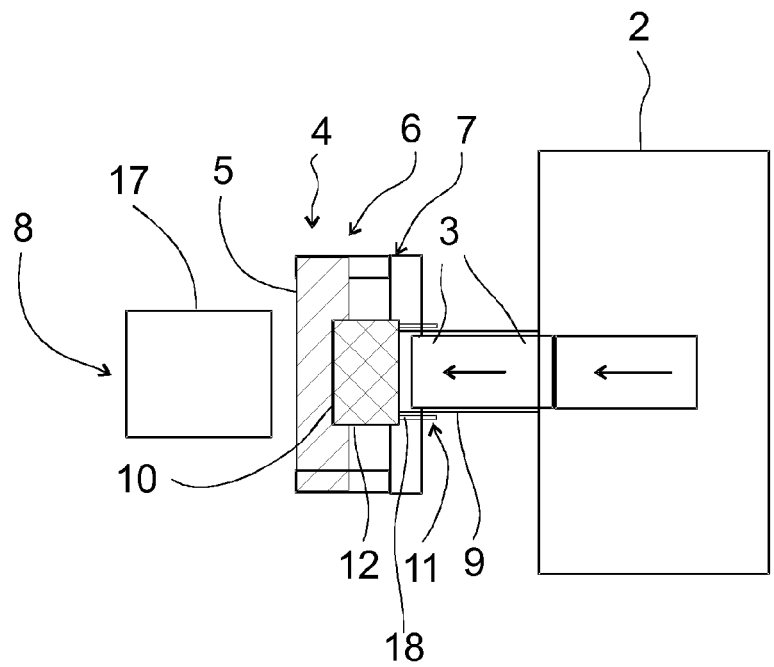

(51) Int. Cl.
　　　*B65B 11/00*　　　(2006.01)
　　　*B65B 63/02*　　　(2006.01)
　　　*A01F 15/07*　　　(2006.01)

(56) References Cited

U.S. PATENT DOCUMENTS

| | | | |
|---|---|---|---|
| 4,655,028 A * | 4/1987 | Silbernagel | 53/399 |
| 4,730,436 A * | 3/1988 | Angelino | 53/170 |
| 5,012,631 A * | 5/1991 | Hostetler et al. | 53/588 |
| 5,182,894 A * | 2/1993 | Bate | 53/399 |
| 5,305,871 A * | 4/1994 | Scherer | 198/737 |
| 5,433,058 A | 7/1995 | Peterson | |
| 5,531,061 A | 7/1996 | Peterson | |
| 7,536,844 B2 * | 5/2009 | Aubin et al. | 53/582 |
| 2005/0016130 A1 * | 1/2005 | Matsumoto | 53/439 |
| 2005/0178084 A1 * | 8/2005 | Haloila | 53/399 |
| 2009/0223179 A1 * | 9/2009 | Johnstone | 53/562 |

FOREIGN PATENT DOCUMENTS

| | | | | |
|---|---|---|---|---|
| DE | 4021307 A1 * | 1/1992 | | A01F 15/071 |
| DE | 4037533 A1 * | 5/1992 | | A01F 15/071 |
| DE | 19654982 A1 | 6/1998 | | |
| DE | 19955830 A1 * | 5/2001 | | B65B 11/008 |
| EP | 1541008 A1 | 6/2005 | | |
| FI | 107440 B | 8/2001 | | |
| GB | 2254824 A | 10/1992 | | |
| JP | 2002225807 A * | 8/2002 | | B65B 11/08 |
| WO | 9422717 A1 | 10/1994 | | |
| WO | 2009133246 A1 | 11/2009 | | |

OTHER PUBLICATIONS

International Search Report; PCT/FI2010/050871; Feb. 25, 2011, 3 pages.

* cited by examiner

US 9,199,752 B2

METHOD AND APPARATUS FOR PRODUCING WRAPPED BALES

RELATED APPLICATIONS

This application is a national phase patent application of PCT/FI2010/050871, filed on Nov. 2, 2010, entitled "Method and Apparatus for Producing Wrapped Bales," which claims priority to Foreign Patent Application FI 20096129, filed Nov. 2, 2009, which are all incorporated herein by reference.

FIELD OF THE INVENTION

The invention relates to a method for producing wrapped bales, the method including a production stage for producing a bale, a first wrapping stage comprising moving the bale and wrap ping means in relation to each other, said wrapping means having a wrapping material dispenser means, said wrapping material dispenser means being arranged to rotate around said bale in a circular path in a first plane of rotation, whereby a web of wrapping material emerges from said wrapping material dispenser means such that the surface of said web of wrapping material is substantially normal to said first plane of rotation and said web of wrapping material becomes wrapped on the sides of said bale in a first direction of wrapping, moving the bale and a tunnel means in relation to each other such that the bale is moved into the tunnel means, said tunnel means having an open downstream end, moving the bale and tunnel means in relation to each other such that the bale moves inside the tunnel means towards the open downstream end, and moving the bale and tunnel means in relation to each other such that the bale moves through said open downstream end out of the tunnel means.

The invention also relates to an apparatus for producing wrapped bales, the apparatus comprising bale producing means for producing bales, dispenser means for dispensing a web of wrapping material, wrapping means for circulating said dispenser means in a first plane of rotation around said bale for wrap ping said web of wrapping material around said bale while keeping the surface of said web of wrapping material substantially normal to said first plane of rotation, and moving means for receiving a bale from said bale producing means and for moving said bale and said wrapping means in relation to each other such that said bale is moved past said wrapping means in a direction essentially perpendicular to said first plane of rotation, wherein said moving means comprising a tunnel means for receiving the bale from the bale producing means, and wherein tunnel means comprises an open downstream end for feeding the bale out of the tunnel means.

Publication WO/1994/022717 presents a method and an apparatus for wrapping an article with a web-like wrapping material. Said article is in one stage moved past wrapping means while said wrapping means provided with dispenser means are rotated around said article along a circular path in a first plane of rotation. In a further stage of wrapping said article is rotated by rotating means in a second plane of rotation substantially normal to said first plane of rotation. Between said stages the surface of the wrapping material web is turned about 90° such that said surface of said web is always substantially normal to said planes of rotation in both stages.

One problem with the method and apparatus known from publication WO/1994/022717 is that if the article to be wrapped is a bale, the bale must be bound to hold together the material of the bale i.e. to retain the structure of the bale prior to the wrapping. A separate bounding, which is disposed under the wrapping, more precisely between the bale and the wrapping, is after the wrapping of the bale unnecessary for holding the material of bale together, because the wrapping can perform the task of holding the material of bale together.

OBJECTIVE OF THE INVENTION

The object of the invention is to provide a new and inventive method and apparatus for producing wrapped bales which is suitable for producing both wrapped bales provided with a bounding prior to the wrapping and wrapped unbound bales i.e. bales not provided with any bounding prior to the wrapping.

SHORT DESCRIPTION OF THE INVENTION

The method for producing wrapped bales of the invention is characterized by the first wrapping stage including wrapping by means of said wrapping means said web of wrapping material onto a frame means which is movable in relation to the tunnel means to form a tunnel construction comprising wrapping material, arranging the tunnel construction comprising wrapping material in relation to the open downstream end of the tunnel means so that the open downstream end of the tunnel means is situated inside the tunnel construction comprising wrapping material, and moving the bale out of the open downstream end of the tunnel means and at least partly into the tunnel construction comprising wrapping material to attach the tunnel construction comprising wrapping material to the bale.

Preferred embodiments of the method for producing wrapped bales are defined below in this document.

The apparatus for producing wrapped bales of the invention is correspondingly characterized by a frame means which is movable in relation to the tunnel means, in that said frame means and said wrapping means are movable in relation to each other such that said wrapping means is capable of applying wrapping material onto the frame means to form a tunnel construction comprising wrapping material, and in that the tunnel construction comprising wrapping material is arrangable in relation to the open downstream end of the tunnel means so that the open downstream end of the tunnel means is situated inside the tunnel construction comprising wrapping material, which tunnel construction is formed by applying wrapping material onto the frame means, so that a bale that is moved out of the open downstream end of the tunnel means is moved into a tunnel construction comprising wrapping material.

Preferred embodiments of the apparatus for producing wrapped bales are defined below in this document.

The invention also relates to the use of the method described in this document or to the use of the apparatus described in this document.

The invention is based on forming a tunnel construction of wrapping material onto a frame means and on arranging the tunnel construction in relation to the open downstream end of the tunnel means so that the open downstream end of the tunnel means is situated in the tunnel construction of wrapping material. A bale exiting the open downstream end of the tunnel means enters therefore the tunnel construction of wrapping material and the tunnel construction of wrapping material becomes a part of the wrapping or the wrapping capable of at least partly holding the material of the bale together.

After the first wrapping stage in the invention a second wrapping stage can follow, in which the bale, as in the method and the apparatus for wrapping an article with a web-like wrapping material presented in publication WO/1994/

022717, is rotated a second plane of rotation, which is substantially normal to said first plane of rotation, whereby wrapping is provided onto the sides of said bale in a second direction of wrapping substantially normal to said first direction of wrapping.

In a preferred embodiment of the method for wrapping an article with a web-like wrapping material, the method comprises, as in the method presented in publication WO/1994/022717, a first wrapping stage and a second wrapping stage and the apparatus of the invention is designed to perform a first wrapping stage and a second wrapping stage. The first wrapping stage comprises moving the bale and wrapping means in relation to each other, said wrapping means having a wrapping material dispenser means, said wrapping material dispenser means being arranged to rotate around said bale in a circular path in a first plane of rotation, whereby a wrapping material web emerges from said wrapping material dispenser means such that the surface of said wrapping material web is substantially normal to said first plane of rotation and said wrapping material web becomes wrapped on the sides of said bale in a first direction of wrapping. The second wrapping stage comprises turning said bale in a second plane of rotation, which is substantially normal to said first plane of rotation, whereby the wrapping is provided onto the sides of said bale in a second direction of wrapping substantially normal to said first direction of wrapping. The method includes furthermore turning said surface of said wrapping material web emerging from said dispenser means between said first wrapping step and said second wrapping step such that said web surface becomes substantially parallel with said first plane of rotation so that said wrapping means remains in said first plane of rotation thereof. Correspondingly, the apparatus comprises turning means for turning said surface of said web of wrapping material emerging from said dispenser means between the first wrapping stage and the second wrapping stage such that the surface of said web of wrapping material becomes substantially parallel with said first plane of rotation, wherein said turning means for turning said surface of said web of wrapping material is arranged such said wrapping means remains in said first plane of rotation.

LIST OF FIGURES

Figure 2:
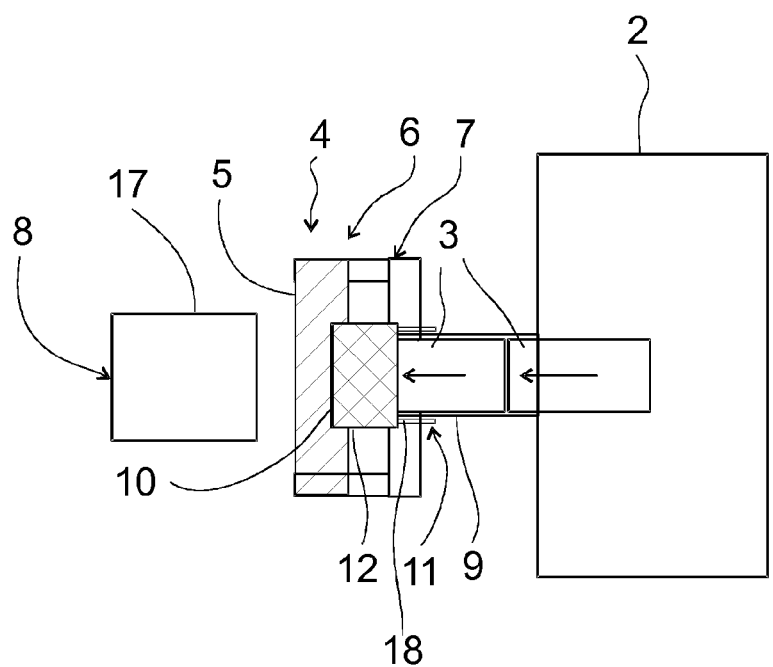
Figure 3:
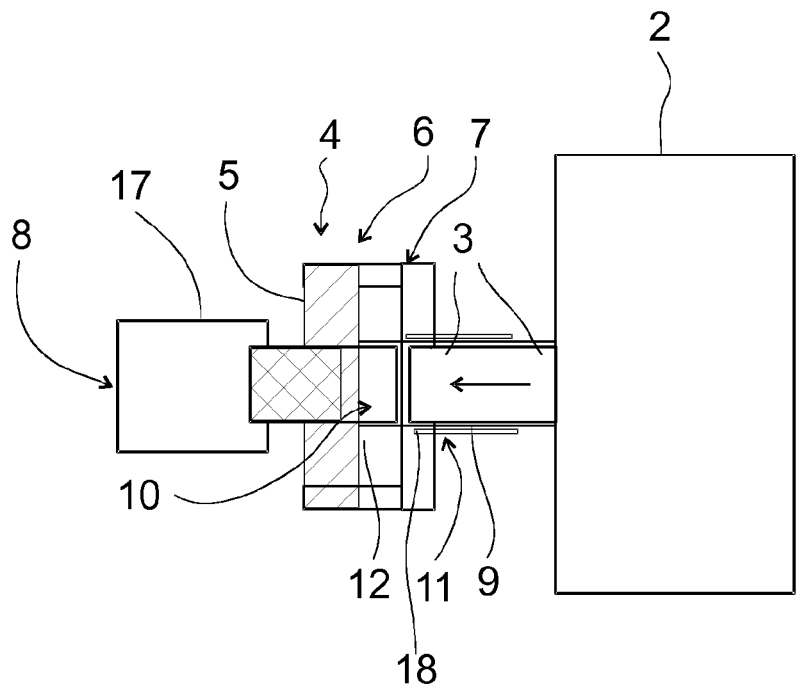
Figure 4:
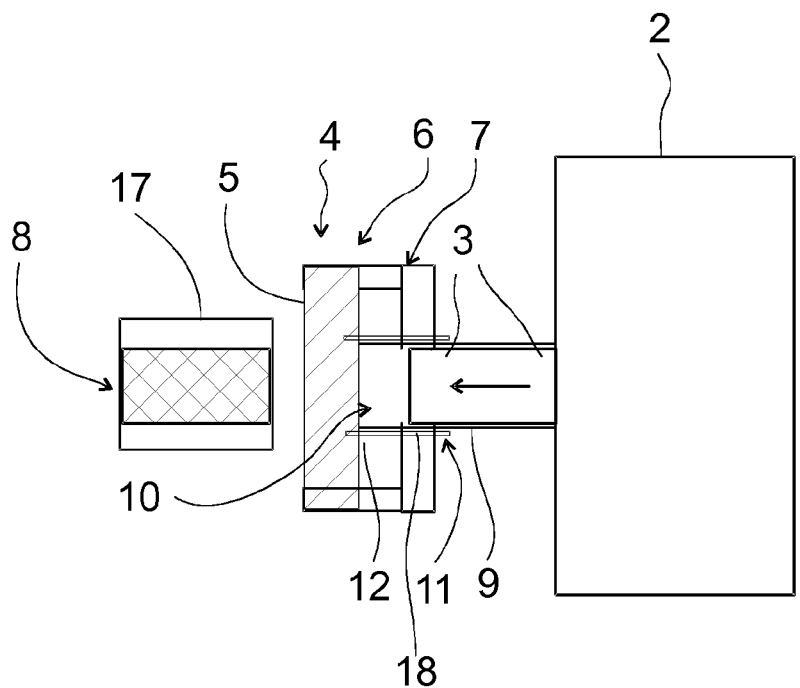
Figure 5:
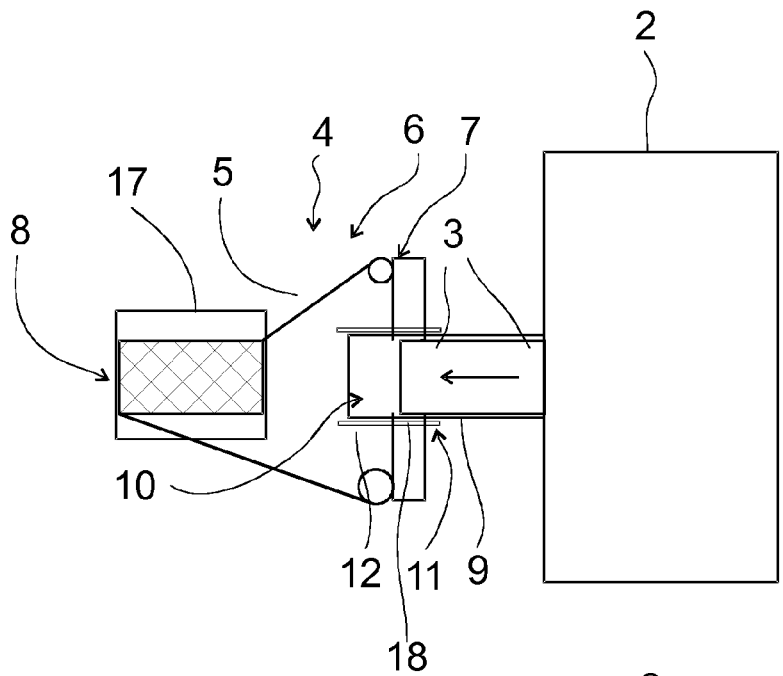
Figure 6:
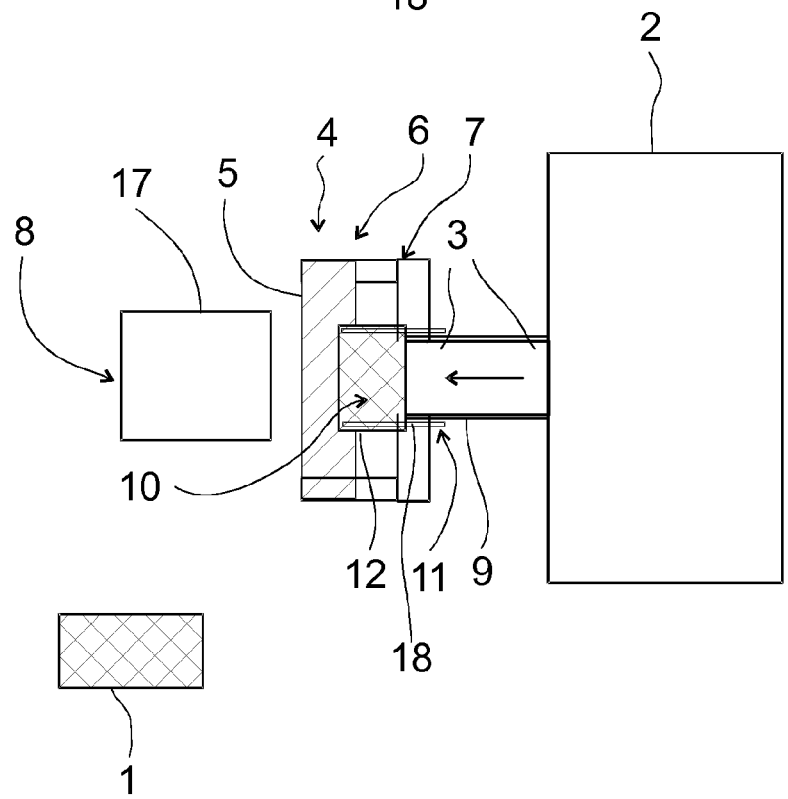
Figure 7:
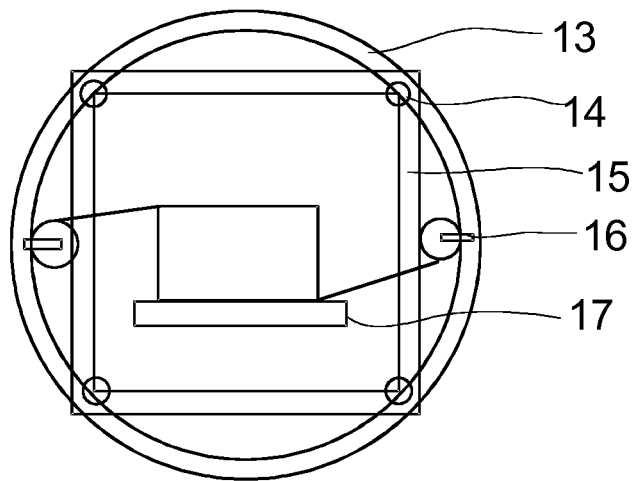
Figure 8:
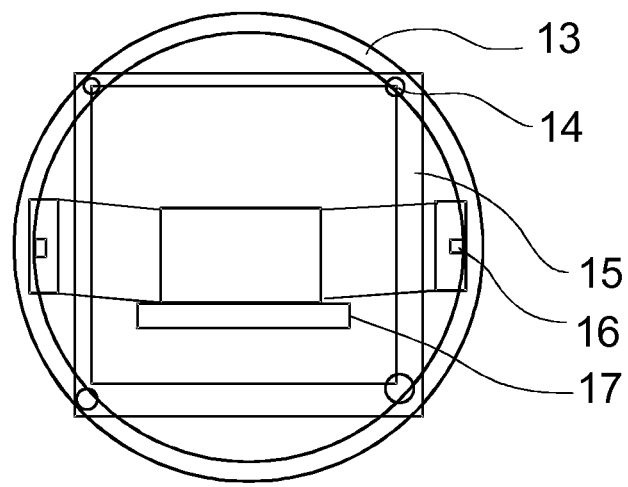

In the following the invention will be described in more detail by referring to the figures, of which FIG. 1 shows in top view wrapping of wrapping material web on a frame means to form a tunnel construction, FIG. 2 shows in top view the situation after FIG. 1 i.e. moving a bale from the tunnel means into the tunnel construction that is formed of web of wrapping material and that is arranged so that the open downstream end of the tunnel means is situated in the tunnel construction, FIG. 3 shows in top view the situation after FIG. 2 i.e. moving the bale out of the open downstream end of the tunnel means so that the tunnel construction becomes attached to the bale and where additional web material is wrapped on the sides of the bale while mowing the bale out of the open downstream end of the tunnel means to wrap the bale with web of wrapping material, FIG. 4 shows in top view the situation after FIG. 3 where the bale has moved completely out of the open downstream end of the tunnel means, FIG. 5 shows in top view a second stage of wrapping that is performed after the situation shown in FIG. 4, FIG. 6 shows in top view the end of the production sequence and including rewrapping of wrapping material web on the frame means, FIG. 7 shows a part of the first stage of wrapping as seen from one end of the apparatus, and FIG. 8 shows a part the second stage of wrapping as seen from one end of the apparatus.

DETAILED DESCRIPTION OF THE INVENTION

The figures show an example of a method and an apparatus according to the invention. First the apparatus and preferable embodiments of the apparatus will be described.

The apparatus for producing wrapped bales 1 comprises bale producing means 2 for producing bales 3. The bale 3 can for example contain straw, fodder, cotton, branch, pulp or waste.

The apparatus comprises furthermore dispenser means 4 for dispensing a web of wrapping material 5.

The apparatus comprises furthermore wrapping means 6 for circulating said dispenser means 4 in a first plane of rotation (not marked with a reference numeral in the drawings) around said bale 3 for wrapping said web of wrapping material 5 around said bale 3 while keeping the surface of said web of wrapping material 5 substantially normal to said first plane of rotation.

The dispenser means 4 and wrapping means 6 correspond preferably, but not necessarily, to the dispenser means 4 and wrapping means 6 presented and described in publication WO/1994/022717.

The apparatus comprises furthermore moving means (not marked with a reference numeral in the drawings) for receiving a bale 3 from said bale producing means 2 and for moving said bale 3 and said wrapping means 6 in relation to each other such that said bale 3 is moved past said wrapping means 6 in a direction essentially perpendicular to said first plane of rotation.

The apparatus shown in the figures comprises furthermore turning means 7 for turning said surface of said web of wrapping material 5 emerging from said dispenser means 4 between a first wrapping stage and a second wrapping stage such that the surface of said web of wrapping material 5 becomes substantially parallel with said first plane of rotation, wherein said turning means 7 for turning said surface of said web of wrapping material 5 is arranged such said wrapping means 6 remains in said first plane of rotation.

The turning means 7 corresponds preferably, but not necessarily, to the turning means 7 presented and described in publication WO/1994/022717.

The apparatus shown in the figures comprises furthermore rotation means 8 for rotating said bale 3 in a second plane of rotation substantially normal to said first plane of rotation.

The rotation means 8 corresponds preferably, but not necessarily, to the rotation means 8 presented and described in publication WO/1994/022717.

Said moving means comprises a tunnel means 9 for receiving bales 3 from the bale producing means 2.

Said tunnel means 9 comprises an open downstream end 10.

The apparatus comprises a frame means 11 which is movable in relation to the tunnel means 9.

The frame means 11 and said wrapping means 6 are movable in relation to each other such that said wrapping means 6 is capable of applying wrapping material 5 onto the frame means 11 to form a tunnel construction 12 comprising wrapping material 5.

The frame means 11, on which wrapping material 5 is applied to form a tunnel construction 12 or on which wrapping material 5 is to be applied to form a tunnel construction 12, is arrangable in relation to the open downstream end 10 of the tunnel means so that the open downstream end 10 of the tunnel means 9 is or becomes situated inside a the tunnel construction 12 comprising wrapping material 5, so that a bale 3 that is moved out of the open downstream end 10 of the tunnel means 9 is moved into a tunnel construction 12 comprising wrapping material 5, which tunnel construction 12 becomes part of the wrapping or the wrapping capable of at least partly holding the material of the bale 3 together.

The tunnel construction 12 can be formed when the frame means 11 is arranged in such position in relation to the open downstream end 10 of the tunnel means 9 so that the tunnel construction 12 comprising wrapping material 5 is formed around the open downstream end 10 of the tunnel means 9 by applying wrapping material 5 at the frame means 11 so that the open downstream end 10 of the tunnel means 9 will become situated in the tunnel construction 12 that is formed.

Alternatively, the tunnel construction 12 may initially be formed at a distance from the open downstream end 10 of the tunnel means 9 and thereafter the tunnel construction 12 can be moved in relation to the open downstream end 10 of the tunnel means 9 so that the open downstream end 10 of the tunnel means 9 will become situated in the tunnel construction 12.

In an apparatus as the one shown in the figures the frame means 11 may be movable both in relation to the wrapping means 6 and in relation to the tunnel means 9 in such a way that the frame means 11 is firstly perpendicularly movable in relation to a first plane of rotation of the dispenser means 4 of the wrapping means 6 so that wrapping material is applied at the sides of the frame means 11 while moving the frame means 11 in relation to the wrapping means to form the tunnel construction 12 comprising wrapping material 5 onto the frame means and in such a way that the tunnel construction 12 formed onto the frame means 11 is thereafter movable in relation to the tunnel means 9 so that the open downstream end 10 of the tunnel means 9 is situated inside the tunnel construction 12 comprising wrapping material 5.

The frame means 11 comprises preferably, but not necessarily, bars, rods 18, or similar elongate elements. One purpose of the frame means 11 is to provide such a support for the tunnel construction 12 comprising wrapping material 5 so that when the bale 3 is at least partly moved into the tunnel construction 12, the frame means 11 enables the wrapping material 5 of the tunnel construction 12 to be in contact with the bale 3 so that the wrapping material 5 of the tunnel construction 12 is capable of at least partly retaining the structure of the bale 3. This is important because the tunnel construction 12 will become the final wrapping for the bale 3 or part of the final wrapping for the bale 3.

In one embodiment of the invention the frame means 11 comprises four rods 18 which are arranged in relation to each other so that wrapping material 5 applied with said wrapping means 6 onto the frame means 11 forms a tunnel construction 12 having a rectangular cross-shape and that is supported by said four rods 18.

In the figures the frame means 11 is in the form of a movable open sided tunnel means that is movably arranged in relation to the tunnel means 9 around the tunnel means 9 and that has an open downstream end and that has essentially the same form as the tunnel means 9, but a larger cross-section. The movable open sided tunnel means has at least one open side such that wrapping material 5, which is applied with said wrapping means 6 on the movable open sided tunnel means to form a tunnel construction 12 comprising wrapping material 5, is configured to come in contact through said at least one open side of the movable open sided tunnel means with a bale 3 that is to be moved from the open downstream end 10 of the tunnel means 9 into the movable open sided tunnel means. In the figures the movable open sided tunnel means is formed by four rods 18, each of which forms an edge of the movable open sided tunnel means so that a movable open sided tunnel means is formed that has a rectangular cross-section and four open sides. Alternatively one side, two sides, or three sides of the movable open sided tunnel means shown in the figures could be formed by a plate or corresponding sheetlike member to form a closed side.

The tunnel means 9 is preferably, but not necessarily, stationary arranged in relation to the bale producing means 2.

Said tunnel means 9 is preferably, but not necessarily, configured to hold the bales 3 at least partly compressed while the bales 3 are at least partly inside the tunnel means 9 to at least partly retain the structure of a bale 3 while the bales 3 are at least partly inside the tunnel means 9.

Said bale producing means 2 are preferably, but not necessarily, configured to produce unbound bales, and said tunnel means 9 consequently are preferably, but not necessarily, configured to receive unbound bales from said bale producing means 2.

Said wrapping means 6 includes in the figures a substantially vertically disposed circular ring 13 which is rotatably assembled onto a support roller means 14 disposed in a framework 15 of the apparatus which circular ring 13 preferably further includes a support arm 16 extending from said circular ring 13 for pivotally supporting said dispenser means 4.

The substantially vertically disposed circular ring 13, the support roller means 14, the framework 15 and the support arm 16 correspond preferably, but not necessarily, to the substantially vertically disposed circular ring 13, the support roller means 14, the framework 15 and the support arm 16 presented and described in publication WO/1994/022717. The open downstream end 10 of the tunnel means 9 is preferably, but not necessarily, provided with elastic of flexible additional supporting means 18 for supporting and/or pressing a bale 3 exiting the open downstream end 10 of the tunnel means 9 and for lowering the friction between the open downstream end 10 of the tunnel means 9 and the web of wrapping material 5 to make the releasing of the web of wrapping material 5 from the open downstream end 10 of the tunnel means 9 easier when a bale 3 is moved apart from the open downstream end 10 of the tunnel means 9.

The apparatus for producing wrapped bales can be a stationary apparatus or a movable apparatus mounted for example on a trailer to be pulled by a tractor.

Next the method and preferable embodiments of the method will be described. The method for producing wrapped bales 1 includes a production stage for producing a bale.

The method for producing wrapped bales 1 includes in addition a first wrapping stage comprising moving the bale 3 and wrapping means 6 in relation to each other, said wrapping means 6 having a wrapping material dispenser means 4, said wrapping material dispenser means 4 being arranged to rotate around said bale 3 in a circular path in a first plane of rotation, whereby a web of wrapping material 5 emerges from said wrapping material dispenser means 4 such that the surface of said web of wrapping material 5 is substantially normal to said first plane of rotation and said web of wrapping material 5 becomes wrapped on the sides of said bale 3 in a first direction of wrapping.

The first wrapping stage including moving the bale 3 and a tunnel means 9 in relation to each other such that the bale 3 is moved into the tunnel means 9; said tunnel means 9 having an open downstream end 10.

The first wrapping stage including in addition moving the bale 3 and tunnel means 9 in relation to each other such that the bale 3 moves inside the tunnel means 9 towards the open downstream end 10.

The first wrapping stage including in addition moving the bale 3 and tunnel means 9 in relation to each other such that the bale 3 moves through said open downstream end 10 out of the tunnel means 9.

The first wrapping stage including wrapping by means of said wrapping means 6 said web of wrapping material 5 onto a frame means 11 which is movable in relation to the tunnel means 9 to form a tunnel construction 12 comprising wrapping material 5.

The first wrapping stage including arranging the frame means 11 in relation to the open downstream end 10 of the tunnel means 9 so that the open downstream end 10 of the tunnel means 9 is situated inside the tunnel construction 12 comprising wrapping material 5.

In the first wrapping stage the tunnel construction 12 can be formed when the frame means 11 is arranged in such position in relation to the open downstream end 10 of the tunnel means 9 so that the tunnel construction 12 comprising wrapping material 5 is formed around the open downstream end 10 of the tunnel means 9 by applying wrapping material 5 onto the frame means 11 so that the open downstream end 10 of the tunnel means 9 will become situated in the tunnel construction 12 that is formed.

Alternatively in the first wrapping stage the tunnel construction 12 may firstly be formed at a distance from the open downstream end 10 of the tunnel means 9 and thereafter the tunnel construction 12 can be moved in relation to the open downstream end 10 of the tunnel means 9 so that the open downstream end 10 of the tunnel means 9 will become situated in the tunnel construction 12.

The first wrapping stage including moving the bale 3 out of the open downstream end 10 of the tunnel means 9 and at least partly into the tunnel construction 12 comprising wrapping material 5 to attach the tunnel construction 12 comprising wrapping material 5 to the bale 3.

The method includes preferably, but not necessarily, continuing wrapping by means of said wrapping means 6 said web of wrapping material 5 onto the sides of the bale 3 while the bale 3 moves through said open downstream end 10 out of the tunnel means 9.

The method includes preferably, but not necessarily, continuing wrapping by means of said wrapping means 6 said web of wrapping material 5 onto the sides of the bale 3 while the bale 3 moves completely out of said tunnel means 9 through said open downstream end 10 of said tunnel means 9.

The method includes preferably, but not necessarily, continuing wrapping by means of said wrapping means 6 said web of wrapping material 5 onto the sides of the bale 3 while the bale 3 moves completely out of said tunnel means 9 through said open downstream end 10 of said tunnel means 9 and continuing wrapping by means of said wrapping means 6 said web of wrapping material 5 after that the bale 3 has moved completely out of said tunnel means 9 through said open downstream end 10 so that wrapping material 5 is wrapped onto the frame means 11.

The first wrapping stage includes preferably, but not necessarily, using a frame means 11 in the form of a movable open sided tunnel means that is movably arranged in relation to the tunnel means 9 around the tunnel means 9 and that has an open downstream end and that has essentially the same form as the tunnel means 9, but a larger cross-section. The movable open sided tunnel means has at least one open side such that wrapping material 5, which is applied with said wrapping means 6 on the movable open sided tunnel means to form a tunnel construction 12 comprising wrapping material 5, is configured to come in contact through said at least one open side of the movable open sided tunnel means with a bale 3 moved from the open downstream end 10 of the tunnel means 9 into the movable open sided tunnel means.

The method includes preferably, but not necessarily, a step for moving the frame means 11 in relation to the tunnel means 9 while moving the bale 3 out of the open downstream end 10 of the tunnel means 9 into the tunnel construction 12 comprising wrapping material 5 to detach the frame means 11 from the tunnel construction 12 comprising wrapping material 5.

The frame means 11 may be provided with means for adjusting the size of the cross-section of the frame means 11 so that the size of the cross-section of the tunnel construction 12 is amended.

The tunnel section 9 may be provided with means for adjusting the size of the cross-section of the tunnel section 9.

The method for producing wrapped bales 1 includes in a preferred embodiment of the method in addition a second wrapping stage comprising turning said bale 3 in a second plane of rotation, which is substantially normal to said first plane of rotation, whereby the wrapping is provided onto the sides of said bale 3 in a second direction of wrapping substantially normal to said first direction of wrapping. The method for producing wrapped bales 1 includes in this preferred embodiment in addition a step of turning said surface of said web of wrapping material 5 emerging from said dispenser means 4 between said first wrapping step and said second wrapping step such that said web surface becomes substantially parallel with said first plane of rotation so that said wrapping means 6 remains in said first plane of rotation thereof.

The moving of the bale 3 inside the tunnel towards the open downstream end 10 of the tunnel means 9 is preferably, but not necessarily, achieved by pushing the bale 3 with another bale, and consequently the moving of the bale 3 out of the tunnel means 9 to attach the web of wrapping material 5 wrapped on said open downstream end 10 and/or on the sided of said open downstream end 10 is preferably, but not necessarily, achieved by pushing the bale 3 with another bale.

The method of the first wrapping stage includes preferably, but not necessarily, holding the bale 3 compressed by means of the tunnel means 9 while the bale 3 is at least partly inside the tunnel means 9.

Said wrapping means 6 comprises preferably, but not necessarily, a circular ring 13 provided with a dispenser means 4 rotated along a circular path in a substantially vertical plane and said bale 3 is rotated in a substantially horizontal plane on a rotation means 8 for turning said bale 3 in said second plane of rotation.

The production stage for producing a bale 3 comprises preferably, but not necessarily, producing a bale 3 in the form of an unbound bale.

Next the production sequence illustrated in FIGS. 1 to 6 will shortly be described.

In FIG. 1 a tunnel construction 12 is formed by wrapping web of wrapping material 5 by means of a wrapping means 6 on a frame means 11 comprising rods 18. In FIG. 1 the tunnel construction 12 is arranged in relation to the open downstream end 10 of the tunnel means 9 so that the open downstream end 10 of the tunnel means 9 is situated inside the tunnel construction 12.

In FIG. 2 a bale 3 is starting to move out of the open downstream end 10 of the tunnel means 9 and into the tunnel construction 12.

In FIG. 3 the tunnel construction 12 is attached to the bale 3 and the frame means 11 is moved in relation to the tunnel means 9, which in the figure means that the frame means 11 is moved to the right. At the same time as the bale 3 is moved out of the open downstream end 10 of the tunnel means 9, the wrapping means 6 wraps web of wrapping material 5 on the sides of the bale 3.

In FIG. 4 the bale 3 has moved completely out of the open downstream end 10 of the tunnel means 9 and is situated on a rotation means 8.

FIG. 5 shows in top view the situation after FIG. 4 the second stage of wrapping comprising turning said bale 3 in a second plane of rotation, which is substantially normal to said first plane of rotation, whereby the wrapping is provided onto the sides of said bale 3 in a second direction of wrapping substantially normal to said first direction of wrapping.

FIG. 6 shows in top view the situation after FIG. 5, which can be considered to be the end of the production sequence. FIG. 6 shows, as does FIG. 1, a tunnel construction 12 formed by wrapping web of wrapping material 5 by means of a wrapping means 6 on a frame means 11 comprising rods 18.

It is apparent to a person skilled in the art that as technology advances, the basic idea of the invention can be implemented in various ways. The invention and its embodiments are therefore not restricted to the above examples, but they may vary within the scope of the claims.

LIST OF REFERENCE NUMERALS USED

1. Wrapped bale
2. Bale producing means
3. Bale
4. Dispenser means
5. Web of wrapping material
6. Wrapping means
7. Turning means
8. Rotation means
9. Tunnel means
10. Open downstream end
11. Frame means
12. Tunnel construction
13. Substantially vertically disposed circular ring
14. Support roller means
15. Framework
16. Support arm
17. Conveyor means
18. Rods

The invention claimed is:

1. A method for wrapping bales, the method comprising:
a first wrapping stage comprising:
receiving a bale from a tunnel means, wherein the tunnel means has a proximal end and a distal end, and the distal end is an open downstream end;
moving a frame means, which is movable in relation to the tunnel means, in relation to the tunnel means in a forward direction that points from the proximal end toward the distal end;
rotating a wrapping material dispenser means around the bale in a circular path in a first plane of rotation, whereby a web of wrapping material emerges from the wrapping material dispenser means such that a surface of the web of wrapping material is substantially normal to the first plane of rotation;
wrapping by a wrapping means the web of wrapping material onto the frame means to form a tunnel construction comprising the web of wrapping material;
arranging the tunnel construction in relation to the open downstream end of the tunnel means so that the open downstream end is situated inside the tunnel construction;
receiving the bale out of the open downstream end of the tunnel means and at least partly into the tunnel construction to attach the tunnel construction to the bale; and
detaching the frame means from the tunnel construction by moving the frame means in relation to the tunnel means in a backward direction that points from the distal end toward the proximal end while the bale moves out of the open downstream end of the tunnel means into the tunnel construction.

2. The method of claim 1, further comprising:
continuing wrapping by the wrapping means the web of wrapping material onto the sides of the bale while the bale moves through the open downstream end out of the tunnel means.

3. The method of claim 2, further comprising:
continuing wrapping by the wrapping means the web of wrapping material onto the sides of the bale while the bale moves completely out of the tunnel means through the open downstream end of the tunnel means.

4. The method of claims 1, 2, or 3, further comprising:
holding the bale at least partly compressed by means of the tunnel means while the bale is at least partly inside the tunnel means.

5. The method of claims 1, 2, or 3, further comprising:
a second wrapping stage comprising turning the bale in a second plane of rotation that is substantially normal to the first plane of rotation, whereby the web of wrapping material is provided onto sides of the bale in a second direction of wrapping substantially normal to a first direction of wrapping provided in the first wrapping stage; and
turning the surface of the web of wrapping material emerging from the dispenser means between the first wrapping stage and the second wrapping stage such that the web surface becomes substantially parallel with the first plane of rotation so that the wrapping means remains in the first plane of rotation.

6. The method of claims 1, 2, or 3, wherein the received bale is in the form of an unbound bale.

7. The method of claim 1, further comprising:
moving the bale and the tunnel means in relation to each other, wherein moving the bale and the tunnel means in relation to each other includes:
moving the bale into the tunnel means;
moving the bale inside the tunnel means towards the open downstream end of the tunnel means; and
moving the bale through the open downstream end out of the tunnel means.

8. The method of claim 7, wherein:
moving the bale inside the tunnel means towards the open downstream end of the tunnel means and moving the bale through the open downstream out of the tunnel means are achieved by pushing the bale with another bale.

9. A method for producing wrapped bales, the method comprising:
producing a bale; and
wrapping the bale using the method of claim.

10. The method of claim 1, further comprising wrapping the web of wrapping material on the sides of the bale in a first direction of wrapping.

11. An apparatus for wrapping bales, the apparatus comprising:
a dispenser means configured to dispense a web of wrapping material; and
a wrapping means configured to circulate the dispenser means in a first plane of rotation around a bale
wherein:
the apparatus is configured to be coupled to a moving means configured to move the bale and the wrapping means in relation to each other,
the moving means comprises a tunnel means configured to receive the bale, and
the tunnel means has a proximal end and a distal end, the distal end being an open downstream end configured to feed the bale out of the tunnel means,
and wherein:
the apparatus further comprises a frame means that is movable in relation to the tunnel means,
the frame means and the wrapping means are movable in relation to each other,
the frame means is configured to move in relation to the tunnel means in a forward direction that points from the proximal end toward the distal end,
upon the forward direction movement of the frame means, the wrapping means is configured to apply the web of wrapping material onto the frame means to form a tunnel construction comprising the web of wrapping material,
the frame means is arrangable in relation to the open downstream end of the tunnel means so that the open downstream end of the tunnel means is situated inside the tunnel construction,
the tunnel construction is formed by applying the web of wrapping material onto the frame means so that the bale that is moved out of the open downstream end of the tunnel means is moved into the tunnel construction, and
the frame means is configured to detach from the tunnel construction by moving the frame means in relation to the tunnel means in a backward direction that points from the distal end toward the proximal end while the bale moves out of the open downstream end of the tunnel means into the tunnel construction.

12. The apparatus of claim 11, wherein:
the frame means is in the form of a movable open sided tunnel,
the movable open sided tunnel is arranged around the tunnel means,
the movable open sided tunnel includes the open downstream end of the frame means, and
the movable open sided tunnel has essentially the same form as the tunnel means and has a cross-section that is larger than a cross-section of the tunnel means,
the movable open sided tunnel has at least one open side configured such that the web of wrapping material that is applied with the wrapping means onto the movable open sided tunnel to form the tunnel construction is configured to come in contact through the at least one open side with the bale that is moved from the open downstream end of the tunnel means into the movable open sided tunnel.

13. The apparatus of claim 12, wherein the movable open sided tunnel is formed by four rods, each of which forms an edge of the movable open sided tunnel so that the movable open sided tunnel is formed with a rectangular cross-section and four open sides.

14. The apparatus of claims 11, 12, or 13, wherein the moving means receives the bale from a producing means and the tunnel means is stationary arranged in relation to the bale producing means.

15. The apparatus of claims 11, 12, or 13, wherein the tunnel means is configured for holding the bale at least partly compressed while the bale is at least partly inside the tunnel means.

16. The apparatus of claims 11, 12, or 13, wherein the open downstream end of the tunnel means is provided with elastic of flexible additional supporting means for supporting and/or pressing the bale exiting the open downstream end of the tunnel means and for lowering the friction between the open downstream end of the tunnel means and the web of wrapping material wrapped onto the open downstream end of the tunnel means and/or onto the sides of the open downstream end of the tunnel means.

17. The apparatus of claims 11, 12, or 13, wherein the wrapping means includes a substantially vertically disposed circular ring that is rotatably assembled onto a support roller means disposed in a framework of the apparatus, and wherein the circular ring includes a support arm extending from the circular ring for pivotally supporting the dispenser means.

18. The apparatus of claims 11, 12, or 13, further comprising:
a turning means for turning the surface of the web of wrapping material emerging from the dispenser means between a first wrapping stage and a second wrapping stage such that the surface of the web of wrapping material becomes substantially parallel with the first plane of rotation, wherein the turning means is arranged such that the wrapping means remains in the first plane of rotation, and
a rotation means for rotating the bale in a second plane of rotation substantially normal to the first plane of rotation.

19. The apparatus of claims 11, 12, or 13, wherein a bale producing means is configured to produce unbound bales the tunnel means is configured to receive unbound bales from said bale producing means.

20. The apparatus of claim 11, wherein the frame means comprises a rod.

21. The apparatus of claim 11, wherein the frame means comprises a plate.

22. An apparatus for producing wrapped bales, the apparatus comprising:
a bale producing means configured to produce a bale;
a moving means configured to receive the bale from the bale producing means; and
the apparatus of claim 11 configured to receive the bale from the moving means and to wrap the bale.

* * * * *

UNITED STATES PATENT AND TRADEMARK OFFICE
CERTIFICATE OF CORRECTION

PATENT NO. : 9,199,752 B2  Page 1 of 1
APPLICATION NO. : 13/515767
DATED : December 1, 2015
INVENTOR(S) : Kalle Kivela It is certified that error appears in the above-identified patent and that said Letters Patent is hereby corrected as shown below:

In the claims

Column 10; Claim 9; Line 64 please amend:

"wrapping the bale using the method of claim." to --wrapping the bale using the method of claim 1--

Signed and Sealed this
Nineteenth Day of April, 2016

Michelle K. Lee
*Director of the United States Patent and Trademark Office*